(12) United States Patent
Bloch

(10) Patent No.: US 7,916,398 B2
(45) Date of Patent: Mar. 29, 2011

(54) HIGH PERFORMANCE FRONT OBJECTIVE FOR VIDEO METROLOGICAL SYSTEM

(75) Inventor: Stephanie Bloch, Rush, NY (US)

(73) Assignee: Quality Vision International, Inc., Rochester, NY (US)

( * ) Notice: Subject to any disclaimer, the term of this patent is extended or adjusted under 35 U.S.C. 154(b) by 307 days.

(21) Appl. No.: 11/974,518

(22) Filed: Oct. 12, 2007

(65) Prior Publication Data

US 2009/0096912 A1    Apr. 16, 2009

(51) Int. Cl.
*G02B 13/22*    (2006.01)
*G02B 9/00*    (2006.01)

(52) U.S. Cl. .................... 359/663; 359/796

(58) Field of Classification Search ............ 359/663, 359/676, 379, 380, 385–390, 367, 821, 822, 359/796, 797

See application file for complete search history.

(56) References Cited

U.S. PATENT DOCUMENTS

| | | | |
|---|---|---|---|
| 5,690,417 A | 11/1997 | Polidor et al. | |
| 6,179,439 B1 | 1/2001 | Choate | |
| 6,292,306 B1 | 9/2001 | Betensky | |
| 6,488,398 B1 * | 12/2002 | Bloch et al. | 359/368 |
| 6,518,996 B1 | 2/2003 | Polidor et al. | |
| 2009/0067043 A1 * | 3/2009 | Lau et al. | 359/629 |

* cited by examiner

*Primary Examiner* — Alicia M Harrington
(74) *Attorney, Agent, or Firm* — Stephen B. Salai, Esq.; Thomas B. Ryan, Patent Agent; Harter Secrest & Emery LLP

(57) ABSTRACT

This high performance front objective lens system intended primarily for use with a video inspection apparatus has a first lens set in the form of a doublet, with a second lens set intermediate the first lens set and the imaging plane. The second lens set includes a doublet and an adjacent lens. The overall system has an effective focal length of 50 mm, a front focal length of 38.75 mm, and a numerical aperture greater than 0.2. Further, the material of the doublets is chosen to have a small, gradual transition in index between the elements of the lens and the cement, minimizing back reflections and thereby eliminating the need for index matching coatings on the cemented surfaces of the doublets. Finally, the imaging plane of the system matches that of standard ring lights used with video inspection apparatus.

20 Claims, 5 Drawing Sheets

HIGH PERFORMANCE FRONT OBJECTIVE FOR VIDEO METROLOGICAL SYSTEM

BACKGROUND AND SUMMARY

This invention relates to automated metrological machines used for optical inspection of an object. Metrological machines are typically employed for the automated optical inspection of manufactured objects, and are particularly useful in determining the precise dimensional measurements of such objects. They normally include a support on which the work object rests, and means for precisely moving either the object or an imaging video camera that is used for recording and/or displaying a magnified image of the object that is being inspected. These features allow such machines to perform precision measurements in the horizontal (or X-Y) plane. Autofocus means can also be included for determining heights of the object along the "Z" axis normal to the X-Y plane, enabling a full, three-dimensional inspection of the object.

A good example of an advanced metrological machine system is provided by U.S. Pat. No. 6,518,996 for a "Compact Video Inspection Apparatus with Y,Z,X Compounded Measurement Axes" (2003). In this patent, the object to be inspected is positioned on a support surface beneath a series of imaging lenses that are secured to a system support that overlies the support surface and object. The lenses have an optical axis disposed vertically with a front lens and either a fixed or a zooming system in the back focusing on a camera sensor (imaging plane).

A good example of a lens system used in such an inspection apparatus is provided by U.S. Pat. No. 6,292,306, for a "Telecentric Zoom Lens System for Video Based Inspection System" (2001). Collimated space behind the front lens provides room for the insertion of a beamsplitter, such as the beamsplitter 16 shown in FIG. 1 of '306. The beamsplitter allows for additional optical systems to be added to the system such as the coaxial through-the-lens ("TTL") surface illumination system described in '306. This system is used to inject surface inspection illumination from an illumination source transverse to the optical axis along the optical axis through the lens (i.e., "TTL"). (See, e.g., "illuminator light source S" in U.S. Pat. No. 6,292,306 and its accompanying drawing figures).

The complete illumination system for an advanced metrological machine may also include profile (back light) illumination, and a fiber bundle ring light or a LED variable ring light (dark field) illumination. (See, e.g., U.S. Pat. Nos. 6,488, 398; 5,690,417; and 6,179,439). The fiber bundle ring light and the LED variable ring light are optimized for the standard focal length of a 1× front objective lens (e.g., 100 mm effective focal length (EFL)). However, the coaxial illumination system previously discussed can create a "hot spot" at low magnification and a loss of contrast at high magnification with the light rays reflecting off the surfaces of the lens into the camera.

In addition, the LEDs of the LED variable ring light are focused onto the stage with a, typically, 76 mm EFL Fresnel lens. (See, U.S. Pat. No. 5,690,417). When, as is current practice, 2× attachment lenses are used in addition to the existing standard lens, a 2× lens adapter tube is needed to match the focus of the Fresnel lens. The addition of this adapter tube changes the characteristics of the optical system. The focal length of the front lens is no longer 50 mm (1× plus 2× attachment) and the system NA (numerical aperture) is lowered from the standard 0.2. Also, the front lens now blocks the inner ring of the LED ring light. However, without the adapter tube, the ring light focuses far below the front focus of the front lens, thus providing little or no illumination. And, in addition to matching the illuminator for more light, a large working distance is always a benefit for objects with a variation in feature heights. This will prevent collision with the lens when focusing on a lower feature of the object. (The light sources for the previously described system are, in most cases, white).

Even more problems arise when the above-described system is used with a through the lens (TTL) laser range sensor that emits a laser beam (e.g., typical wavelength 655 nm) through the front lens onto the object and collects the reflected light through the same lens. The sensor for the laser is different from the camera sensor. The laser system works best with the 2× lens characteristics. The larger the NA of the system, the better the resolution of the laser system. With the mechanical restriction on the diameter of the front lens and the necessity of the 50 mm focal length, the optimal NA is 0.22. Because of the input of the laser (which enters the optical system via a beamsplitter inserted behind the front lens, as described with reference to U.S. Pat. No. 6,292,306), the lens must be infinity corrected for optimum performance of the laser system as well as the main imaging system to be achieved.

I have, therefore, sought and invented a system with a 50 mm effective focal length replacement lens system self-corrected to be used with multiple back end systems—such as zoom lenses; color corrected for full white light illumination and color cameras (but which can also be used with monochromatic systems and black and white cameras); and infinity corrected to allow for the insertion of the tilted beam splitter in the collimated space to provide surface illumination and laser input/collection.

This replacement 2× lens system will take the place of the standard 1× lens-2× attachment lens combination. The effective focal length is 50 mm to be a true 2× of the standard 1×, 100 mm EFL lens. The full 22 mm diameter of the front lens space is utilized for the NA of 0.22 for best laser range sensor results.

The materials for the doublets of this new system were chosen to have a small transition, in the same direction, in index between the lens elements of the doublets and the cement joining them. This eliminates the need for index matching coating on the cemented surfaces of said lens. This index matching coating is necessary when there is a large difference between the index of the glass and that of the cement, or if both the glass indices surrounding the cement are higher in index than the cement. Without the coating, there are back reflections of light off these lens surfaces and back to the camera, adding to the "hot spot" of the system. Using glass types F5 (index of 1.6) and FK51 (index of 1.48) with cement (index of 1.5) in-between produces minimum back reflections.

The non-cemented air-glass surfaces of all of the lenses of this system except for one have multi-layer anti-reflection coating, for minimum reflection of white light—a necessary step in order to reduce the hotspot created by the surface illuminator. The concave curve on remaining lens is coated with a "v-coat" to block the back reflection of the laser light that is focused onto the camera. The curve, in relation to the imaging system, actually focuses the back reflection of the laser light off this surface into the camera plane of the video system.

The working distance of the lens system is increased from 28 mm to 38.75 mm (where 28 mm is the working distance that the old 1×-2× combination system provided). And, the position of the lens in the mount is optimized with respect to the Fresnel lens of the standard ring light illuminator so the focal planes of the new system and that of the ring light correspond for maximum illumination. Consequently, the Z-height of this system's focal plane is the same as that of the standard. In addition, the tapered end of the lens system keeps it from blocking any of the light from the LEDs.

In summary, this system cures many deficits found in the current 1×-2× combination, including specifically those growing out of its use with variable illumination sources commonly used with metrologic machines, such as TTL white light illuminators, TTL laser illuminators, and standard ring light illuminators.

DESCRIPTION

Figure 1:
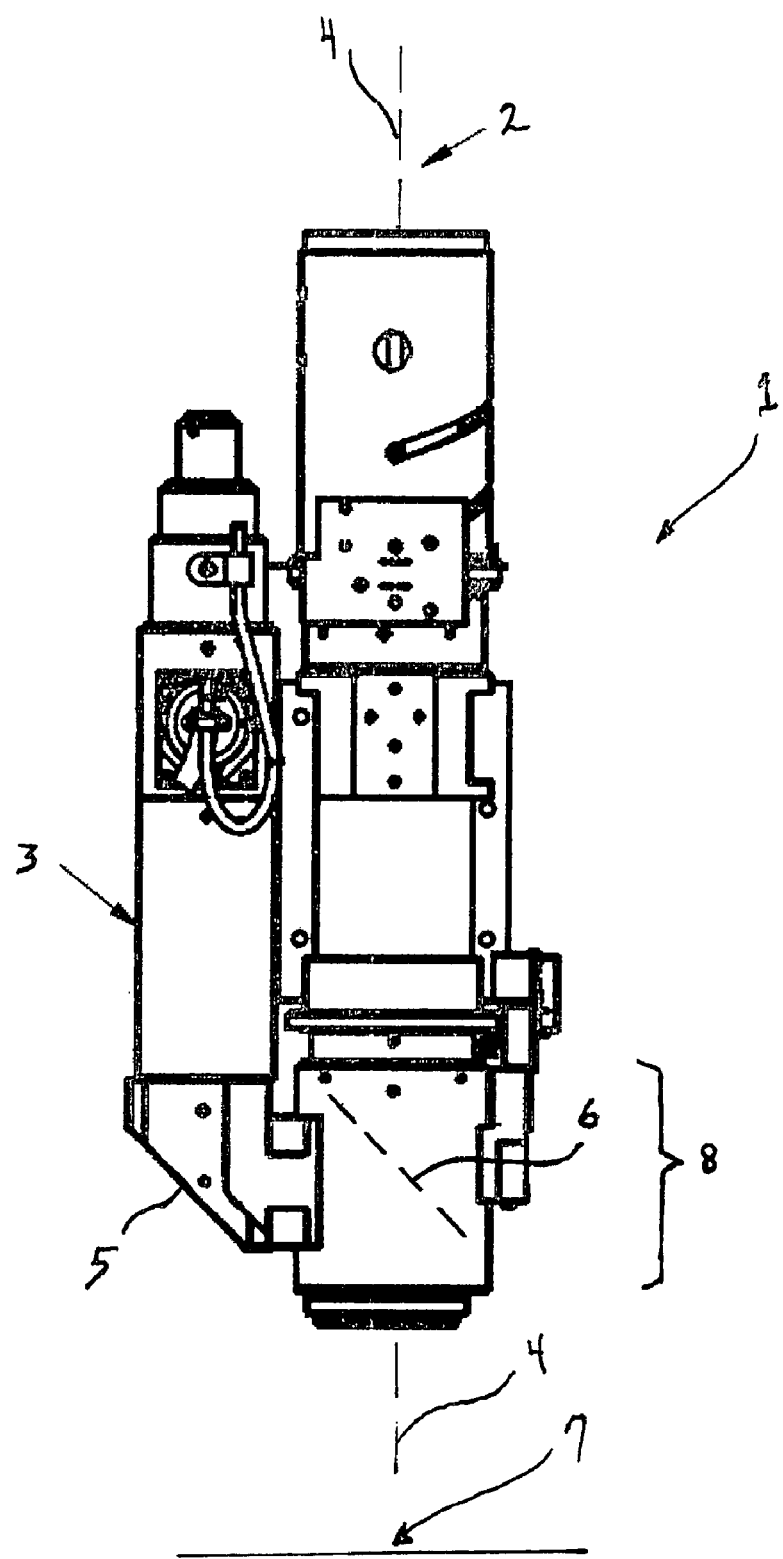
FIG. 1 provides a front elevational view illustrating some basic components of a metrological machine.

FIG. 1 provides an illustration of some primary components of a basic metrological machine (denoted generally by arrow 1) sans imaging camera (which would normally be located at 2). A through-the-lens illumination system 3 projects illumination (including possible monochromatic or laser illumination) that is reflected 90 degrees by a mirror located at corner 5 so as to transversely intersect the main optical axis 4 in the region of a beam splitter (denoted by broken line 6) oriented to reflect a portion of the illumination downward along the main optical axis 4 onto a work object located in an inspection zone at imaging plane 7 below the metrological machine 1. (Cf., U.S. Pat. No. 6,292,306, and discussion above). The beamsplitter 6 is located in collimated space 8 behind a front lens for the system.

Figure 2:
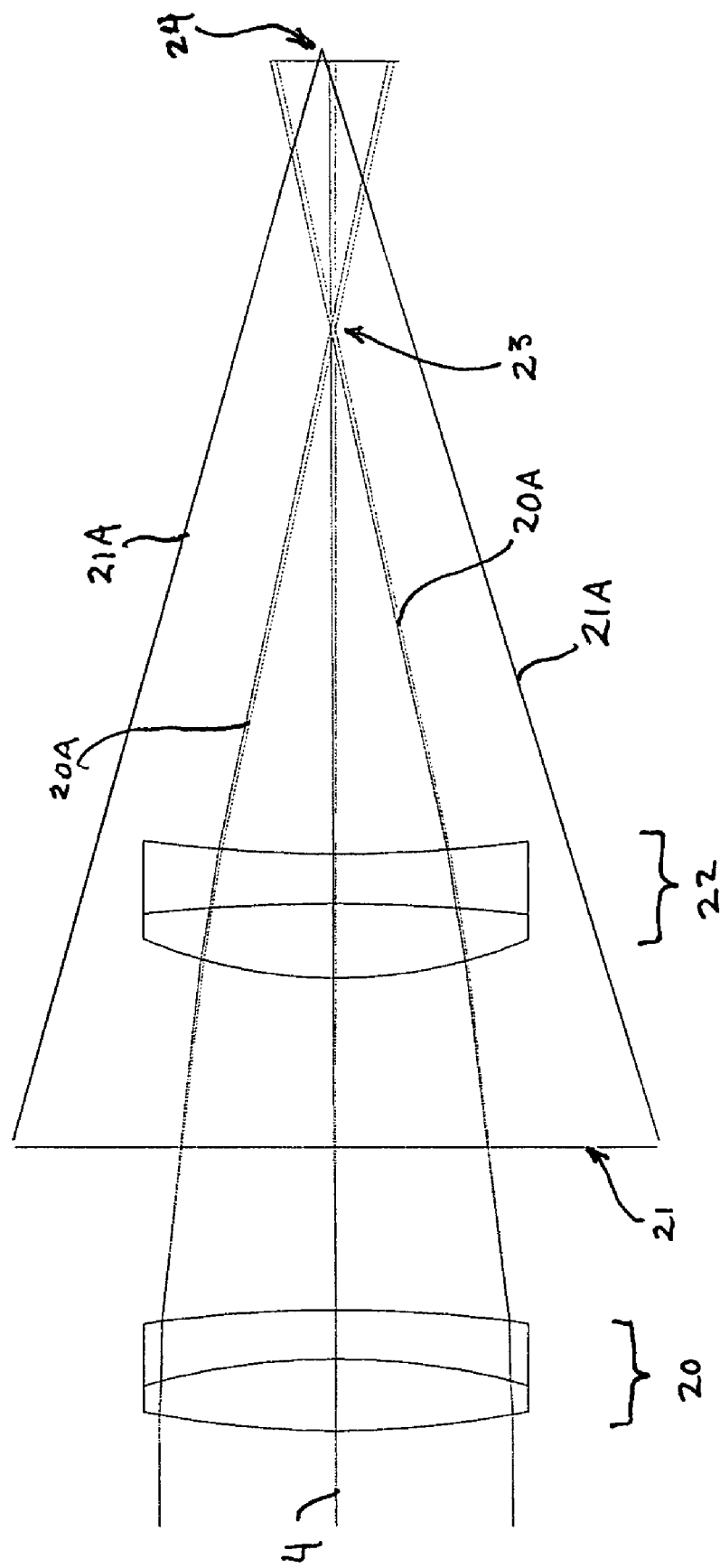
FIG. 2 provides a schematic illustration of a lens assembly featuring a 1× lens with a 2× adapter lens, and illustrates the disparate focii of the ring light illuminator and the optical system.

FIG. 2 provides a schematic illustration of a lens assembly featuring a 1× front lens doublet 20 in use with a 2× adapter lens doublet 22. Lines 20A indicate light rays passing through lens doublets 20, 22 and a focus 23 therefore. Of particular interest in this figure is line 21, which indicates the central opening in an annular light ring illuminator mounted on metrological machine 1, while lines 21A indicate the angle of light from the inner ring of the said illuminator. (See, e.g., U.S. Pat. No. 5,690,417 and FIG. 3). As will be noted, even though the system illustrated in FIG. 2 has been optimized for use with a laser with a 50 mm EFL and 0.22 NA, the focal plane 24 of the illuminator ring does not correspond with front focus 23 at imaging plane 7.

Figure 3:
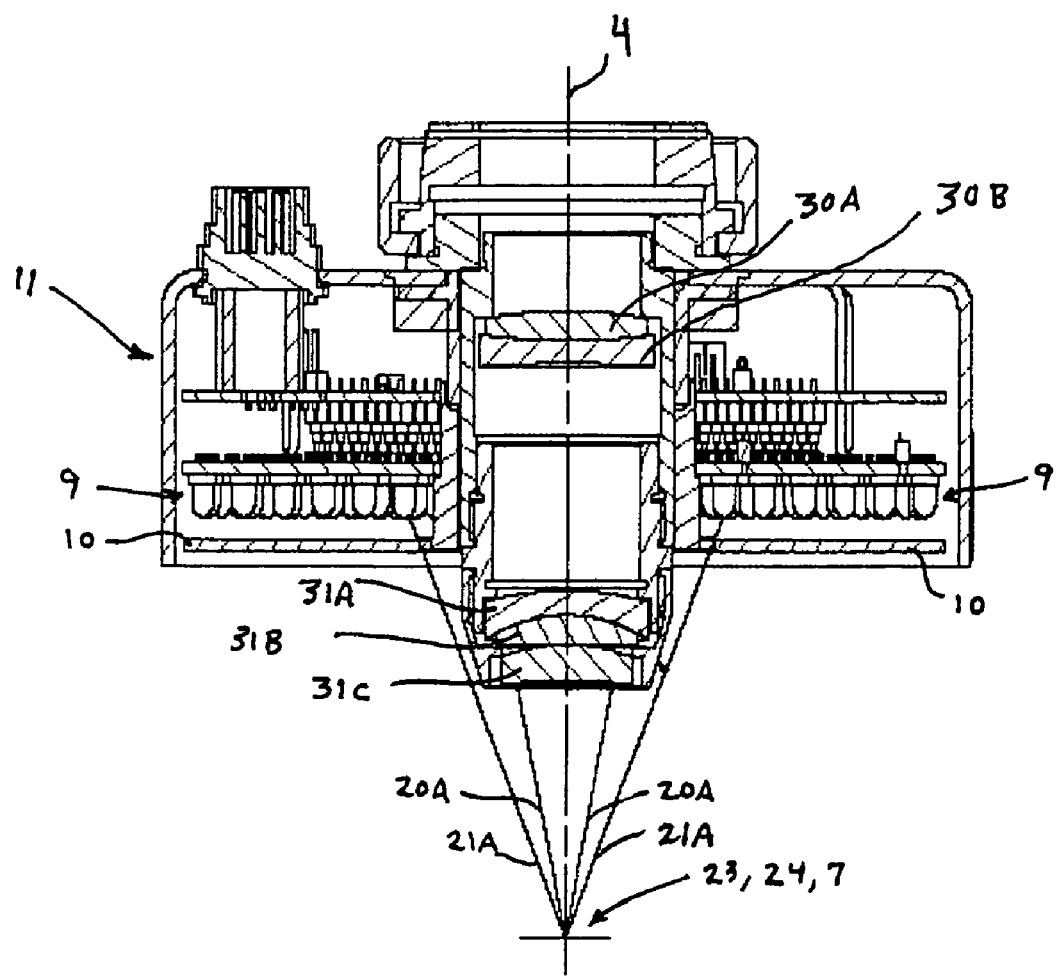
FIG. 3 provides a cross-sectional side view illustrating the lens system of the instant invention in operative relationship to an LED ring light with Fresnel lens.
Figure 4:
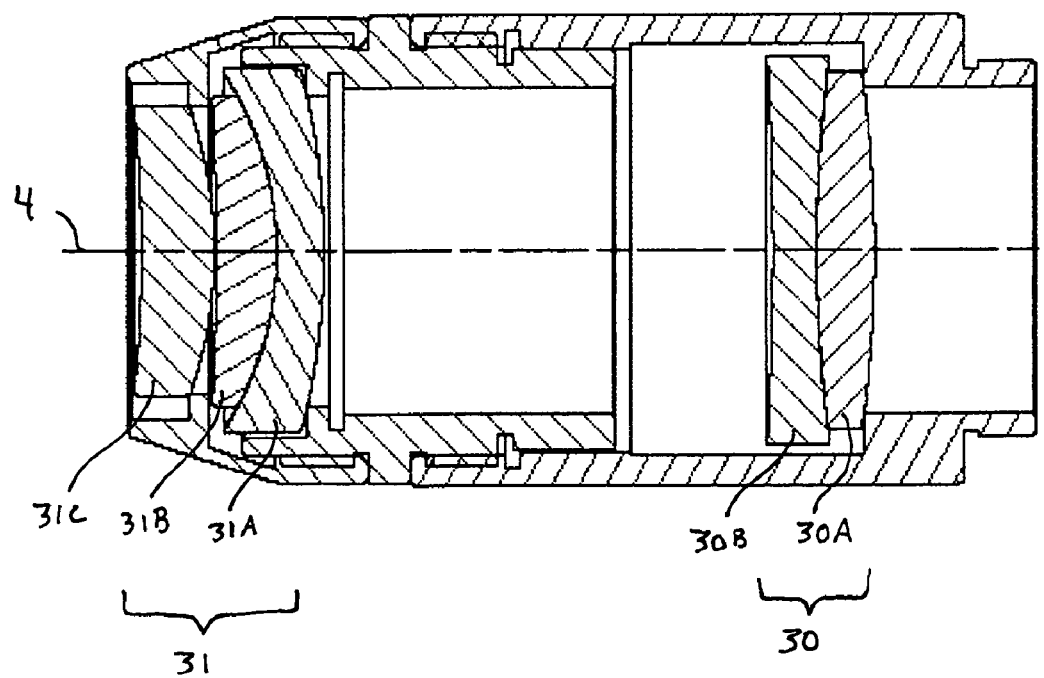
FIG. 4 provides a more detailed cross-sectional view of the lens system of the instant invention.
Figure 5:
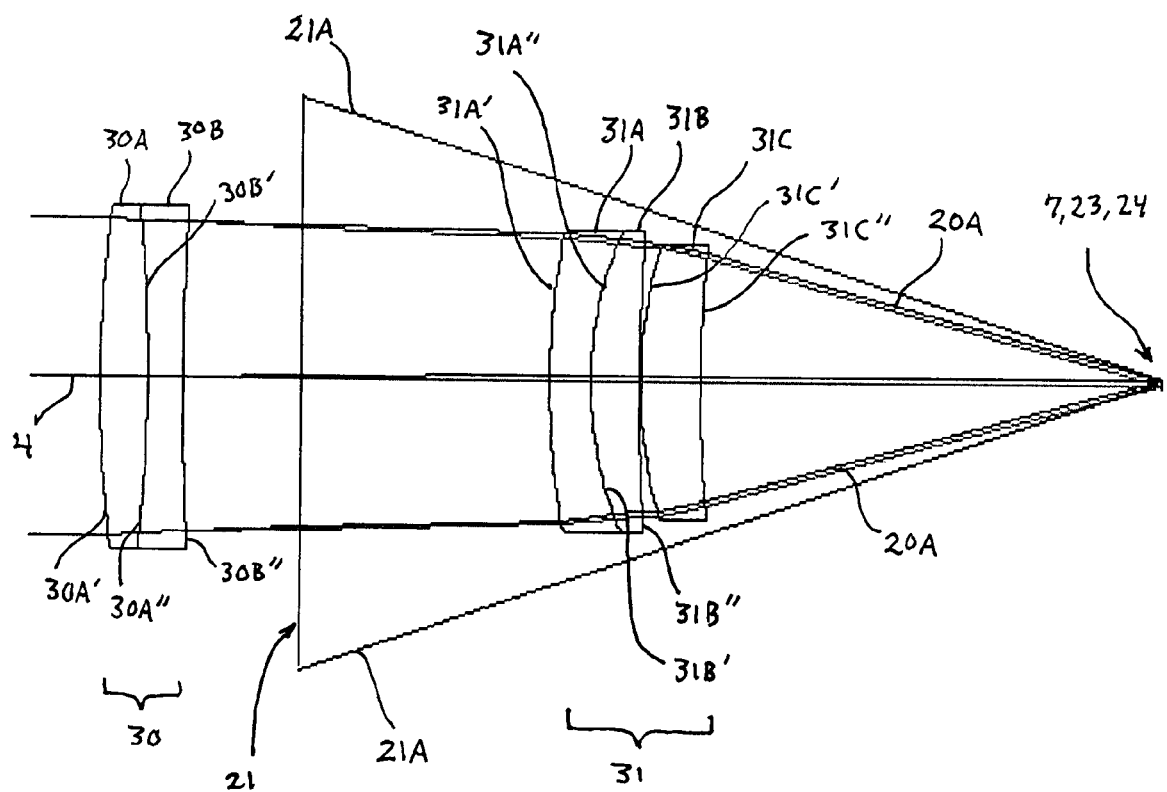
FIG. 5 provides a schematic illustration of the lens system of the instant invention.

FIGS. 3 through 5 provide illustrations of the high performance front objective lens system of the invention, with FIGS. 3 and 4 providing the best overview of the physical lay-out of the invention (particularly in relation to an LED light array 9 with Fresnel lens 10), and FIG. 5 providing a more figurative delineation of the invention. As will be noted, the invention includes a first lens set 30 which is, like that of the system illustrated in FIG. 2, a doublet. The doublet of lens set 30 includes lenses 30A, 30B, while a second lens set 31 in spaced relationship to the first lens set 30 and intermediate the first lens set 30 and the imaging plane/focal point/focal plane 7, 23, 24 includes a doublet 31A, 31B and an adjacent lens 31C. Each of the aforesaid lenses, in turn, have a distal surface more distant from the imaging plane/focal point/focal plane 7, 23, 24 and a proximal surface that is closer to the imaging plane/focal point, focal plane 7, 23, 24. Thus, turning first to the lenses comprising the first lens set 30—lens 30A has a distal surface 30A' and a proximal surface 30A", and lens 30 also has a distal surface 30B' and a proximal surface 30B". Likewise, in the second lens set 31, lens 31A has a distal surface 31A' and a proximal surface 31A", lens 31B has a distal surface 31B' and a proximal surface 31B", and lens 31C, has a distal surface 31C' and a proximal surface 31C".

The aforesaid optical system can be more specifically defined in terms of the applicable radius of curvature of each optical surface. In optical design, the distance from the vertex of the curve (which is located here on the optical axis 4) to the center of curvature for the surface (also located here on the optical axis 4) is the radius of curvature of the surface. As a matter of convention herein, if the vertex of a surface bows away from the imaging plane/focal point/focal plane 7, 23, 24 (such as surfaces 30A' and 30B"), the radius of curvature is positive. Likewise, if the vertex bows towards the imaging plane/focal point/focal plane 7, 23, 24 (such as surfaces 30A" and 30B'), the radius of curvature is negative. Thus, when viewing a bioconvex lens in profile and in accordance with the conventions adopted herein, the surface radius of curvature of the surface proximate the focal point will be negative and the radius of curvature of the surface distal the focal point will be positive. This information is provided to avoid confusion as the conventions used in different arts vary.

Thus, the invention can be more specifically described as comprising a first lens set 30 comprising lens elements 30A, 30B forming a doublet and a second lens set 31 in space relationship to the first lens set 30 and intermediate the first lens set 30 and the imaging plane/focal point/focal plane 7, 23, 24 with the second lens set comprising lens elements 31A and 31B forming a doublet and an adjacent (but slightly separated) lens element 31C, where the radii of curvatures of the optical surfaces of said lenses are all positive except for the adjacent lens surfaces 30A" and 30B' of the doublet forming the first lens set 30, which are negative. However, as would be expected in an optical design and as previously discussed in general terms, the other aspects of the system's design—such as the specific radius of curvature for each optical surface, the thickness of each optical lens/space, the material comprising each lens/space, and the applicable aperture radius—are also critical to achieving optimal performance in accordance with the goals of the invention. For example, the tapering aperture radii of the lenses 31A, 31B, 31C make possible the tapered end of the lens system and keep it from blocking light from the LEDs 9.

Consequently, viewing FIG. 5 from left to right the applicable radii of curvature of the denoted surface, the thickness of the optical medium defined and bounded thereby, the aperture radius for the surface, and the material comprising the said optical medium (whether lens or space) are set forth in the following table, where distances are given in mm, and which also includes other lens data relevant to the invention:

| SRF | RADIUS | THICKNESS | APERTURE RADIUS | GLASS | SPE |
|-----|--------|-----------|-----------------|-------|-----|
| OBJ | — | 1.0000e+20 | 7.6993e+17 | AIR | |
| 30A' | 78.760 | 4.000 | 11.900 A | FK51 C | |

-continued

| SRF | RADIUS | THICKNESS | APERTURE RADIUS | GLASS | SPE |
|---|---|---|---|---|---|
| 30A" | −100.020 | 3.000 | 12.000 | F5 C | |
| 30B' | " | " | " | " | |
| 30B" | 209.410 | 10.000 | 12.000 | AIR | |
| 31A' | 48.250 | 3.250 | 9.000 | F5 C | |
| 31A" | 21.890 | 4.100 | 9.000 | FK51 C | |
| 31B' | " | " | " | " | |
| 31B" | 183.950 | 0.100 | 9.000 | AIR | |
| 31C' | 29.120 | 5.000 | 9.000 | SSKN5 C | |
| 31C" | 86.630 | 38.749 S | 9.000 | AIR | |
| IMS | — | −0.004078 V | 0.385888 S | | * |

For comparison purposes, the same data with regard to the volume below Fresnel lens 10 is as follows:

| 10 | — | 20.800 | 20.000 | AIR | * |
|---|---|---|---|---|---|

The above-described system has an effective focal length of 50 mm, a front focal length of 38.75 mm, and a numerical aperture of 0.22. It has been found that a small transition (i.e., an index transition of 0.1 or less) in the same direction, in index between the elements of the lens doublets (30A, 30B and 31A, 31B) and the cement joining them (where one element of each doublet is formed from F5 and the other from FK51) eliminates the need for index matching coating on the cemented surfaces of the doublets and back reflections. In addition, the foregoing features are advantageously supplemented by providing anti-reflection coatings to non-cemented surfaces of the lenses 30A, 30B, 31A, 31B, and 31C other than surface 31B". Thus, surfaces 30A', 30B", 31A', 31C', and 31C" receive anti-reflection coatings to minimize back reflection of white light. Surface 31B" on the other hand, is provided with a v-coat in order to minimize reflection of laser light.

Finally, as will be noted, the high performance front objective lens system of this invention cures the ring light problem illustrated and discussed with respect to FIG. 2, as the focal plane 24 of the ring light 11 and the focal point/imaging plane 23, 7 of the system are substantially identical. However, though the invention is generally described in terms of the specific embodiment discussed, numerous changes could be made without exceeding the scope of the inventive concept disclosed herein. Further, various of the above-disclosed and other features and functions, or alternatives thereof, may be desirably combined into many other different systems or applications. Thus, various presently unforeseen or unanticipated alternatives, modifications, variations or improvements therein may be subsequently made by those skilled in the art which are also intended to be encompassed by the following claims.

What is claimed is:

1. A high performance front objective lens system for use in a video inspection apparatus of the type in which an image of an object in an imaging plane is projected to a video camera, the system comprising:
   a first lens set comprising lens elements forming a doublet;
   a second lens set in spaced relationship to the first lens set and intermediate the first lens set and the imaging plane, the second lens set comprising lens elements forming a doublet and an adjacent lens element; and
   wherein each of said lens have first and second optical lens surfaces that are, respectively, more distant from the imaging plane and less distant from the imaging plane, and wherein at least one of: the lens surfaces of the doublet of the second lens set are all bowed away from the imaging plane, the lens surfaces of the second lens set are all bowed away from the imaging plane, and the lens surfaces of both lens sets are all bowed away from the imaging plane except for lens surfaces intermediate the lens elements of the first lens set.

2. The high performance front objective lens system of claim 1, wherein the system has at least one of an effective focal length of 50 mm, a front focal length of at least 38.75 mm, and a numerical aperture greater than 0.2.

3. The high performance front objective lens system of claim 1, wherein the material of the doublets is chosen to have a transition in index of 0.1 or less in one direction between the elements of the lens and the cement.

4. The high performance front objective lens system of claim 3, wherein the transition in one direction in index between the elements of the lens and the cement at least one of: eliminates the need for index matching coating on the cemented surfaces of the doublets, and minimizes back reflections.

5. The high performance front objective lens system of claim 3, wherein the material of the doublet elements is F5 and FK51.

6. The high performance front objective lens system of claim 1, wherein at least one of: anti-reflection coatings are applied to exposed lens surfaces other than an exposed lens surface proximate the adjacent lens element and a v-coat is applied to the exposed lens surface proximate the adjacent lens element.

7. The high performance front objective lens system of claim 6, wherein said anti-reflection coatings minimize back reflection of white light and said v-coat minimizes reflection of laser light.

8. The high performance front objective lens system of claim 1, wherein said video inspection apparatus includes a ring light for dark field illumination, which said ring light has a focal plane, and the focal plane of the ring light and the imaging plane of the system are substantially identical.

9. The high performance front objective lens system of claim 1, wherein when a lens surface bowed away from the focal plane is defined as having a positive radius of curvature and a lens surface bowed towards the focal plane is defined as having a negative radius of curvature, the lenses include at least one of: the lens of the first lens set doublet most distant from the imaging plane having a first lens surface with a radius of curvature of 78.760 and a second lens surface with a radius of curvature of −100.020, the lens of the first lens set doublet less distant from the imaging plane having a first surface with a radius of curvature of −100.020 and a second lens surface with a radius of curvature of 209.410, the lens of the second lens set doublet most distant from the imaging plane having a first lens surface with a radius of curvature of 48.25 and a second lens surface with a radius of curvature of 21.89, the lens of the second lens set doublet less distant from the imaging plane having a first lens surface radius of curvature of 21.89 and a second lens surface radius of curvature of 183.950, and the lens of the adjacent lens of said second lens set having a first lens surface radius of curvature of 29.120 and a second lens surface radius of curvature of 86.630.

10. The high performance front objective lens system of claim 9, wherein the system has at least one of an effective focal length of 50 mm, a front focal length of at least 38.75 mm, and a numerical aperture greater than 0.2.

11. The high performance front objective lens system of claim 9, wherein the material of the doublets is chosen to have a transition in index of 0.1 or less in one direction between the elements of the lens and the cement.

12. The high performance front objective lens system of claim 11, wherein the small transition in one direction in index between the elements of the lens and the cement at least one of: eliminates the need for index matching coating on the cemented surfaces of the doublets, and minimizes back reflections.

13. The high performance front objective lens system of claim 11, wherein the material of the doublet elements is F5 and FK51.

14. The high performance front objective lens system of claim 11, wherein the material of the doublets is chosen to have a small transition in one direction in index between the elements of the lens and the cement which, at least one of: eliminates the need for index matching coating on the cemented surfaces of the doublets, and minimizes back reflections.

15. The high performance front objective lens system of claim 14, wherein the material of the doublet elements is F5 and FK51.

16. The high performance front objective lens system of claim 15, wherein at least one of anti-reflection coatings are applied to exposed non-cemented surfaces of the lenses, and a v-coat is exposed non-cemented surfaces of the lenses, and wherein any said anti-reflection coatings minimize back reflection of white light, and any said v-coat minimizes reflection of laser light.

17. The high performance front objective lens system of claim 16, wherein said video inspection apparatus includes a ring light for dark field illumination, which said ring light has a focal plane, the focal plane of the ring light and the imaging plane of the system are substantially identical, and the lens system has a tapered end that keeps it from blocking light from said ring light.

18. The high performance front objective lens system of claim 9, wherein anti-reflection coatings are applied to exposed lens surfaces other than an exposed lens surface proximate the adjacent lens element and a v-coat is applied to said surface.

19. The high performance front objective lens system of claim 18, wherein said anti-reflection coatings minimize back reflection of white light and said v-coat minimizes reflection of laser light.

20. The high performance front objective lens system of claim 9, wherein said video inspection apparatus includes a ring light for dark field illumination, which said ring light has a focal plane, and the focal plane of the ring light and the imaging plane of the system are substantially identical.

* * * * *